July 30, 1968 K. L. M. SONOSKI 3,394,484
FISHING JIGGER
Filed Dec. 27, 1965

INVENTOR
KENNETH L. M. SONOSKI
By Smart & Biggar
ATTORNEYS

United States Patent Office 3,394,484
Patented July 30, 1968

3,394,484
FISHING JIGGER
Kenneth L. M. Sonoski, Chief Lake Road, R.R. 2,
Sudbury, Ontario, Canada
Filed Dec. 27, 1965, Ser. No. 516,279
Claims priority, application Canada, Feb. 5, 1965,
922,627
10 Claims. (Cl. 43—16)

ABSTRACT OF THE DISCLOSURE

A pendantly supported oscillatable jigger body having a fishing line guide at one end of the body and a pendant fishing line reel at the other end of the body a running hooked fish causes the line to pay out in a jerking fashion to set the hook in the mouth of the fish.

---

This invention is directed to a fishing jigger.

It is common in devices for catching fish to utilize fishing line dispensers such as reels which permit free run-off of the line when pulled by a fish. Other known devices incorporate brakes so that the line does not run off freely.

The devices suffer from the frequent draw-back either that the line is too readily available to the fish and the hook does not become firmly set, or the line is too tight, which results in the loss of the bait, or in breaking of the line.

An object of the present invention is to provide a fishing jigger of simple and robust construction which releases a fishing line in a jerking motion when the bait and hook is taken by the fish. A first jerk occurs on the line immediately following initial release of a loop of line, which tends to set the hook in the mouth of the fish. Additional line is released loop by loop in a succession of jerking motions as the fish maintains tension on the line. This jerky line release tends to maintain the set of the hook, and serves to tire the fish. Continued release of line causes a progressive increase in the tension necessary to obtain further line releases, so that the hooked fish may not readily swim away but has to exert progressively increasing force against the line as the line uncoils.

According to the invention there is provided a fishing jigger comprising a supporting body, fishing line reel-receiving means mounted on the body, fishing line guide means mounted on the body remote from the reel-receiving means, the reel-receiving means being adapted for angular oscillation towards and away from the fishing line guide means whereby in operation pull on the line beyond the guide produces release of the line from the reel in a series of jerking motions, produced by oscillation of the reel-receiving means towards and away from the guide means under the influence of the uncoiling line.

A preferred embodiment of the jigger includes provision for supporting the jigger body for oscillating motion in substantially the same plane as that of the reel, and having the reel suspended in a manner similar to that of a pendulum.

The present invention also provides means for controlling the line tension necessary to operate the device by altering the manner in which it is suspended. An additional feature of the invention is to provide a wind reaction member which produces motion of the line, thus moving the bait in a fashion to attract fish.

The following is a description by way of example of one embodiment in accordance with the present invention, reference being made to the accompanying drawings in which.

Figure 1:
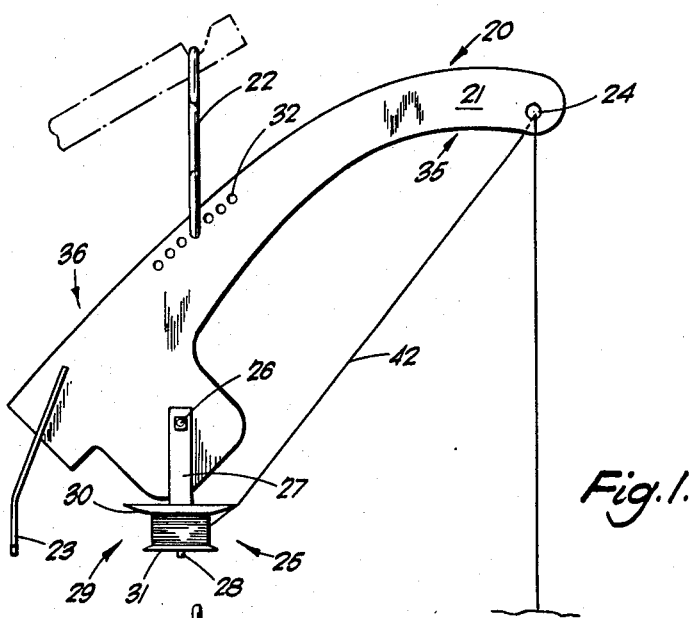
FIGURE 1 is a side view of the jigger in a rest position.

Referring to FIGURE 1 the jigger 20 is shown depending from a support such as a branch or notched stick, supported by means of a support hook 22. In the illustrated embodiment the jigger body 21 is made of flat material such as plywood, having a hole 24 in the nose portion 35 serving as a forward guide for the fishing line 42.

A fishing line reel-receiving assembly 25 is pivotally mounted by pivot pin 26 to the tail portion 36 of the body 21 having a pair of side arms 27 connected to a reel mount 28. The reel assembly 29 is substantially non-rotatably mounted upon the mount 28 by means such as a threaded nut (not shown).

The reel assembly 29 comprises a pair of dished reel ends 30, 31 and an intermediate spindle member (not marked) on which fishing line 42 is wound.

The jigger support hook 22 is attachable to the center portion of the jigger body 21 by any selected one of a series of holes 32 located in the upper portion of the body, and positioned to one side of the center of gravity of the jigger, so what when freely suspended the jigger is always canted in a nose-high position.

A wind engaging sail member 23 is shown slidably attached to tail portion 36 of the jigger 20 by means of inter-engaging slots (not shown) in the tail portion 36 and sail member 23.

In operation, the jigger support hook 22 is set in one of the holes 32, this hole being selected in accordance with the desired line tension, in view of the prevailing conditions such as the length of line in use, size of bait, and the wind conditions. By inserting the support hook 22 through the right-hand end hole 32 the moment arm due to the mass of he jigger body and the reel and reel-receiving assembly is given its maximum value, so that the jigger nose 35 together with the guide 24 is elevated to an extent greater than that shown in FIGURE 1 and the tail portion 36 and its associated assembly is correspondingly depressed downwardly. This setting is suitable for conditions when heavy line loads exist or are anticipated, as the gravitational righting moment of the device achieves its maximum value at this setting.

Figure 2:
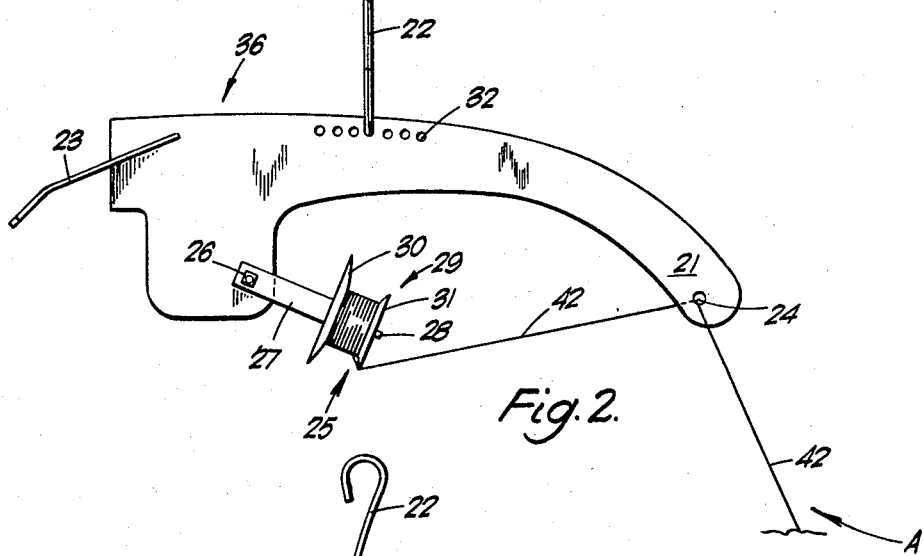
FIGURE 2 is a side view showing the position adopted by the jigger when a downward pull is exerted on fishing line.

When, as shown in FIGURE 2, the bait and hook are taken by the fish, the tension in the line 42 draws the nose 35 of the jigger down to the position shown in FIGURE 2, and also displaces the reel and reel-receiving assembly to the right in pendulum fashion so that line 42 passes smoothly through the guide 24 until a coil of the fishing line can be drawn over the lower reel end 31 and off the reel 29. As the coil of line 42 is drawn in tension over the lower dished reel end 31, a point is reached where the line 42 suddenly slips off the lower edge of the reel end 31 and rapidly releases the coil. This rapid release permits the reel and reel assembly to oscillate arcuately in pendulum fashion to the left and also results in a sudden slackening in the downward pull of the line 42 at the guide 24. This then results in an anticlockwise oscillatory movement of the jigger about its suspension point 32, together with an oscillatory motion of the reel 29 and reel-receiving assembly 25 in a clockwise direction about the suspension point 26, under the influence of gravity.

This composite swinging motion of the moving parts produces a sudden retensioning of the fishing line 42 which because of the momentum of the moving parts, produces a corresponding upward jerk on the line. It is this jerk which sets the hook in the fish.

While the fish maintains sufficient tension upon the line 32 the jigger will continue to oscillate as the line is uncoiled, a loop at a time, thus maintaining a sustained jerking motion while line is being taken, so as to "play" the fish. As the diameter of the coil of line on the reel assembly 29 diminishes, greater force is required to pull the loops of line 42 over the remote edge of the lower reel end 31, so that the restraining force exerted by the line on the fish increases correspondingly.

It will be seen that positioning of the support hook 22 to the left of the position illustrated will result in minimum pull being required in order to uncoil the line 42 from the reel 29.

The sail member 23 is postioned to react with the wind in order to move the tail portion 36 of the jigger in oscillatory fashion, so as to move the bait up and down in a manner to entice fish.

It will be seen that the inclination and therefore the effectiveness of the sail 23 is governed by the setting of the jigger on support hook 22. Thus, for the intermediate support hook position illustrated in FIGURE 1 the sail 23 has a major portion of its surface inclined at an angle to the horizontal so as to produce a desired wind actuated motion. If the support hook 22 is set more to the left, the jigger reposes in a more nearly horizontal rest position, and the inclination of the sail surface 23 from the horizontal plane is correspondingly reduced, thereby reducing the effects of wind action upon the sail. Correspondingly, when the support hook 22 is set further to the right than the hole 32 illustrated under conditions of higher loading such as where a heavy line is in use or where greater tension to effect uncoiling of the line is required, when the major surface of the sail 23 is inclined more nearly normal to the wind to produce a greater wind force upon the device. The use of a sail 23 having adjustable incidence is contemplated.

In order to provide stability of the jigger, in the extreme nose-down condition the point of suspension of the jigger should lie above the center of gravity of the device, and the guide 24 should lie on the side of the support hook 22 opposite from the reel assembly 29.

Figure 3:
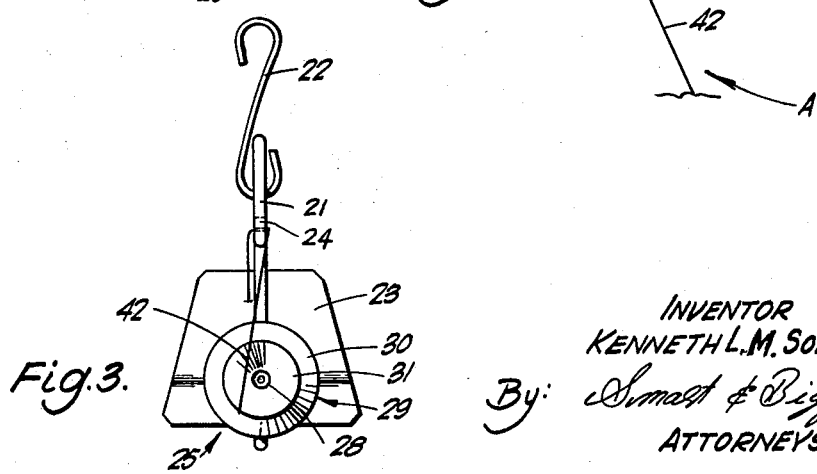
FIGURE 3 is an end view looking in the direction of arrow A with the jigger in the position shown in FIGURE 2.

Referring to the embodiment illustrated in FIGURES 2 and 3 it will be seen that visual indication of jigger operation due either to wind or fish action is made possible even at a distance due to the body area that is visible from the sides and the sail area that is visible from an end view.

The fishing jigger is of particular use in ice fishing as the line may be left unattended for long periods. Due to the characteristic increase in line tension which occurs as additional line is taken the fish cannot readily swim off, and the jigging movement of the device as each loop uncoils, together with the rattle which may be produced by the reel swinging on its mounting act as visual and audible signals for the fisherman.

While the preferred embodiment produces jigging on a fishing line by means of an oscillating body together with an oscillating pendulum-like reel-receiving assembly, it will be seen that certain benefits of the invention can be achieved by pendulum-like or other oscillatory suspension of a substantially non-rotary reel on a non-oscillating body. However, such an arrangement is generally less advantageous than the jigging device described.

What I claim as my invention is:

1. A fishing jigger comprising; an elongate body; means for supporting said body at a point intermediate its ends to permit oscillating about said support means in a substantially vertical plane coincident with said body; fishing line reel-receiving means mounted beneath said body in pendulum fashion for pivotal movement relative thereto in or parallel with said vertical plane; and fishing line guide means on said body remote from said line reel-receiving means, said body supporting point lying between the line reel-receiving means and the guide means, whereby in operation downward pull on the line beyond the guide produces canting of the jigger and jerking of the pendulum reel-receiving means under the effect of the uncoiling line so that the line is in turn released with a jerking motion.

2. A fishing jigger as claimed in claim 1 wherein the reel for use on the reel-receiving means includes a flanged lower member over which the line uncoils, whereby reduction in size of the coil of line increases the distance travelled by the uncoiling line across the flanged member so that downward pull required to uncoil the line becomes progressively greater as more line uncoils.

3. A fishing jigger as claimed in claim 2 further comprising a sail element to provide for wind movement of the device.

4. A fishing jigger as claimed in claim 2 further comprising a sail element to provide for wind movement of the device, and attached at a body extremity.

5. A fishing jigger comprising; an elongated substantially flat body having a nose portion and a tail portion; means for pivotally supporting the body at a point between the nose and the tail portion for oscillating jigging in a substantially vertical plane; fishing line guide means on the body at the nose portion; and fishing line reel-receiving means mounted beneath the body in pendulum fashion from the tail portion for pivotal movement in or parallel with said vertical plane; whereby in operation downward pull on the line beyond the guide produces canting of the jigger and jerking of the pendulum reel-receiving means under the effect of the uncoiling line, so that the line is in turn released with a jerking motion.

6. A fishing jigger as claimed in claim 5 in which said support means comprises a hole extending transversely through said flat body.

7. A fishing jigger as claimed in claim 5 wherein said support means comprises a series of holes extending adjacent the upper edge of the body.

8. A fishing jigger as claimed in claim 5 further including sail means attached to the body to produce oscillatory movement thereof in a vertical plane in response to wind action.

9. A fishing jigger as claimed in claim 8 wherein the sail means is attached to the tail portion of the jigger body.

10. A fishing jigger as claimed in claim 9 wherein said fishing line guide means comprises a hole extending transversely through the nose portion.

References Cited

UNITED STATES PATENTS

| | | | |
|---|---|---|---|
| 510,205 | 12/1893 | Stiner | 43—17 |
| 2,877,591 | 3/1959 | Stabryla | 43—15 |

SAMUEL KOREN, *Primary Examiner.*

D. J. LEACH, *Assistant Examiner.*